(12) United States Patent
Davis et al.

(10) Patent No.: US 6,546,442 B1
(45) Date of Patent: Apr. 8, 2003

(54) COMMUNICATIONS ADAPTER HAVING ANALOG AND DIGITAL INTERFACES FOR COMMUNICATIONS WITH REMOTE SYSTEMS

(75) Inventors: Gordon Taylor Davis, Raleigh, NC (US); Edward Earl Harbour, Cary, NC (US); Paul Leppert, Durham, NC (US); Laurence Victor Marks, Raleigh, NC (US); Andre Byungyup Minn, Raleigh, NC (US); Bryan S. Stevens, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1429 days.

(21) Appl. No.: 08/550,270

(22) Filed: Oct. 30, 1995

(51) Int. Cl.⁷ .............................. G06F 13/38
(52) U.S. Cl. ...................... 710/106; 709/218
(58) Field of Search .......... 395/200.09, 883; 710/62, 63, 105, 106; 709/217, 218

(56) References Cited

U.S. PATENT DOCUMENTS

| | | | |
|---|---|---|---|
| 3,828,325 A | * 8/1974 | Stafford et al. | |
| 4,751,634 A | * 6/1988 | Burrus, Jr. et al. | |
| 4,868,863 A | 9/1989 | Hartley et al. | 379/98 |
| 4,991,169 A | 2/1991 | Davis et al. | 370/77 |
| 5,134,611 A | 7/1992 | Steinka et al. | 370/79 |
| 5,134,648 A | 7/1992 | Hochfield et al. | 379/98 |
| 5,165,022 A | * 11/1992 | Erhard et al. | |
| 5,202,963 A | * 4/1993 | Zelley | |
| 5,249,218 A | 9/1993 | Sainton | 379/59 |
| 5,250,940 A | 10/1993 | Valentaten et al. | 345/189 |
| 5,367,563 A | 11/1994 | Sainton | 379/98 |
| 5,430,618 A | * 7/1995 | Huang | 361/818 |
| 5,483,530 A | 1/1996 | Davis et al. | 370/79 |
| 5,537,558 A | * 7/1996 | Fletcher et al. | |
| 5,598,401 A | * 1/1997 | Blackwell et al. | |

FOREIGN PATENT DOCUMENTS

| | | | |
|---|---|---|---|
| EP | 0560706 | 9/1993 | H04Q/11/04 |
| EP | 0577434 | 5/1994 | H04L/12/40 |
| JP | 5056121 | 3/1993 | H04M/1/00 |
| WO | 8807793 | 10/1988 | H04L/11/16 |

OTHER PUBLICATIONS

PC Magazine, Mar. 14, 1995, Ziff–Davis Publishing Company L.P. Network Edition, "ISDN Sleight of Hand" by John Garris.
IC Card Systems & Design, Jul. 1995, Argus Business "Brining ISDN to PCMCIA" by L. V. Marks, IBM Corporation.
Strass H. "PCMCIA: Karten Gut Gemischt" Elektronik, vol. 3, Feb. 8, 1994, pp 50–54, XP000198008.
Strass H. "PCMCIA: Karten Gut Gemischt Teil: Ein Standard Fur Mobiles Computing Setzt Sich Durch" Electronik, vol. 43, No. 2 Jan. 25, 1994, pp 79–86, XP000425090.

* cited by examiner

Primary Examiner—Gary J Portka
(74) Attorney, Agent, or Firm—Joscelyn G. Cockburn; Bracewell & Patterson

(57) ABSTRACT

An adapter for providing data communications for a personal computer to other remote data communications systems of various communication platforms is disclosed. The remote data communications systems can be a data circuit terminating equipment (DCE) such as a modem, or a data terminating equipment (DTE) such as an ISDN terminal adapter. The adapter comprises a programmable digital signal processing device, a memory device and an assortment of transceiving devices. A software program is stored in the memory device for instructing the programmable digital signal processing device. The transceiving devices are controlled by the programmable DSP device such that the appropriate transceiving device can be activated for providing data communications, according to the type of communication platform utilized by the remote data communications equipment.

16 Claims, 6 Drawing Sheets

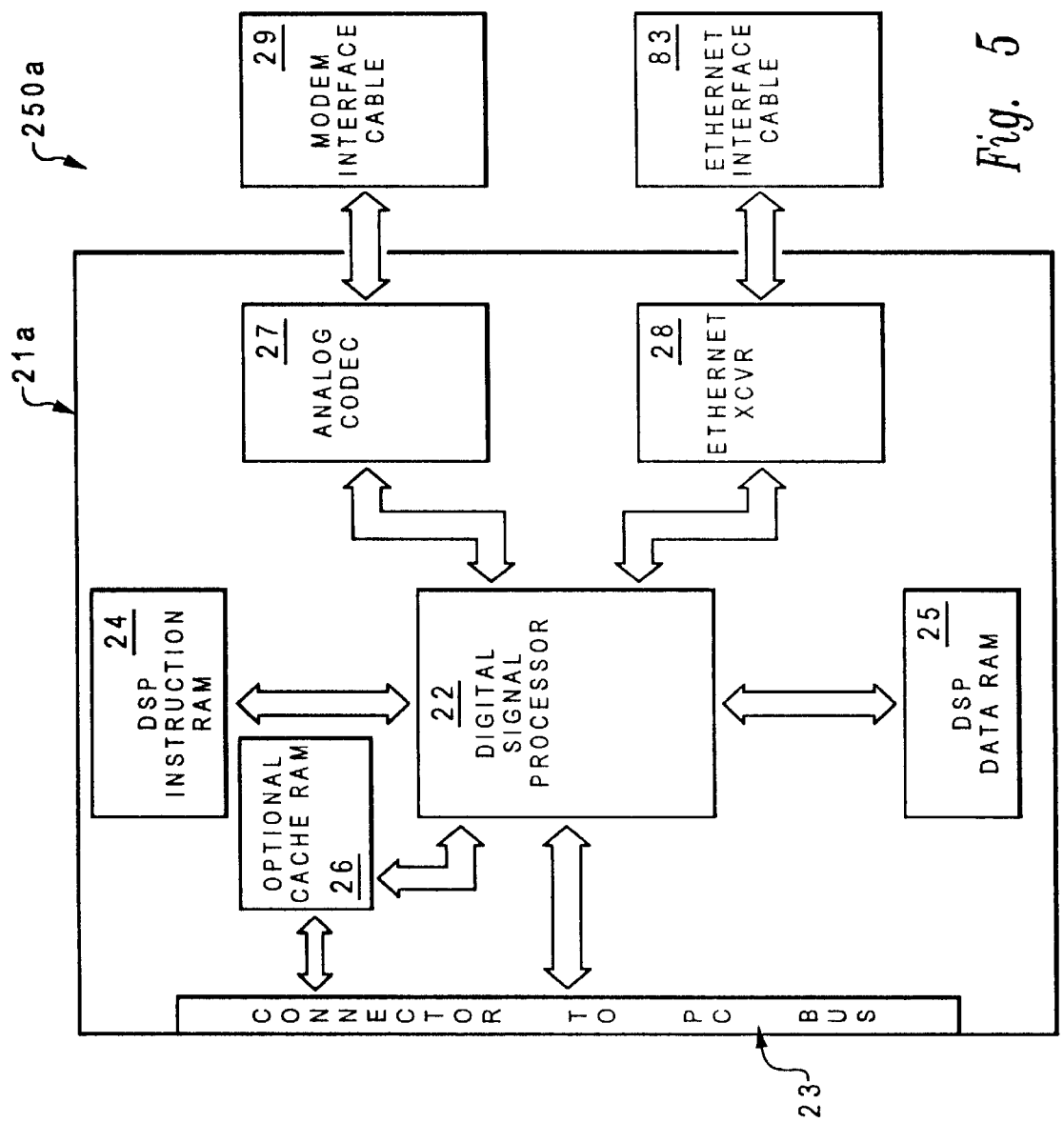

COMMUNICATIONS ADAPTER HAVING ANALOG AND DIGITAL INTERFACES FOR COMMUNICATIONS WITH REMOTE SYSTEMS

RELATED PATENT APPLICATIONS

This is related to commonly assigned U.S. Pat. No. 5,483,530 to Davis et al., entitled System and Method for Communicating with Digital and Analog Devices via a Single Digital Interface, discloses an adapter for communicating with digital and analog data communications equipments. The disclosure of the above patent is incorporated herein by this and subsequent references.

BACKGROUND OF THE INVENTION

1. Technical Field

The present invention relates to an apparatus and system for data communications in general, and in particular to an apparatus for providing data communications between a data processing system and other remote data communications systems. Still more particularly, the present invention relates to an adapter for providing data communications between a computer and other remote data communications systems having various data communication platforms.

2. Description of the Prior Art

With the advent of mobile telephones such as cellular phones and truly portable computers such as laptop computers, notebook computers and even sub-notebook computers, many office workers are more mobile today than they were in the past. In the meantime, most of these "travelling" office workers still require access to the information from their offices even when they are away. For example, a worker who is telecommuting may need to remote access the office files from home. Or in the case of an office worker who is required to travel frequently, the necessity for remote access from a hotel room or a client's location to the home office is commonly seen.

Although portable computers such as those mentioned above are quite easy to travel with, the various types of telecommunication facilities offered in different locations may present some challenges for the travelling office worker. This is because data communications equipment available at different locations may require different communication platforms. For example, a local area network (LAN), such as ARCnet or Ethernet, coupled with an Integrated Services Digital Network (ISDN) may be installed at the office while only an analog public switched telephone network (PSTN) is available at home or at the hotel for modem connection. There have been several attempts to resolve this connectivity problem, which stems from the inability of the data communications equipment to operate and interface with both a digital network and an analog network in general. One solution is to have an adapter designed for each type of telecommunication facilities available at all times. The travelling office worker can then install the appropriate adapter according to the tele-communication facilities provided. Such operations, which may require the opening of the computer chassis, depending on the type of adapter and computer utilized, are quite inconvenient and considerably costly. Also, the need to have several different adapters available is quite expensive as well as cumbersome when travelling.

At present, some manufacturers have attempted to resolve the problem of carrying multiple adapters with a hybrid adapter solution. By combining several separate discrete functions in a single adapter, a hybrid adapter provides the user more freedom than before. This brute force approach, however, does not save much when compared to separate adapters.

Consequently, it would be desirable to provide a single adapter for data communications such that the adapter is capable of transferring data to different communication platforms utilized by various remote data communications systems. Because such an adapter would perform several functions by utilizing common hardware, it would have the convenience of a hybrid adapter and a price comparable to a single adapter.

SUMMARY OF THE INVENTION

In view of the foregoing, it is therefore an object of the present invention to provide an improved apparatus for data communications.

It is another object of the present invention to provide an improved apparatus for providing data communications between a data processing system and other remote data communications systems.

It is yet another object of the present invention to provide an improved adapter for providing data communications between a computer and other remote data communications systems having various data communication platforms.

In accordance with the apparatus and system of the present invention, an adapter is provided for transferring data between a data processing system and a remote data communications system, which comprises a single electronics assembly having a programmable digital signal processing device, a memory device and several transceiving devices. A software program is stored in the memory device for instructing the programmable digital signal processing device. The transceiving devices are controlled by the programmable digital signal processing device such that the appropriate transceiving device can be activated for providing data communications, according to the type of communication platform utilized by the remote data communications system. The remote data communications system can be a data circuit terminating equipment (DCE), such as a modem, or a data terminating equipment (DTE), such as an ISDN terminal adapter. The adapter also has a first connector and a second connector for the type of communication platforms required by the particular remote data communications system, coupled to the transceiving devices for exchanging data with a remote data communications system.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein:

FIG. 5 is a block diagram depicting an alternative embodiment of the present invention having a modem/ethernet combination.

DETAILED DESCRIPTION OF PREFERRED EMBODIMENT

The present invention may be utilized on a variety of computers such as desktop computers, laptop computers or notebook computers. In addition, the computer may be a stand-alone system or part of a network such as local area network (LAN) or wide area network (WAN). For the purpose of illustration, a preferred embodiment of the present invention as described below is adaptable to a portable personal computer, such as the ThinkPad™ Series of notebook computers, manufactured by International Business Machines, Inc.

Figure 1A:
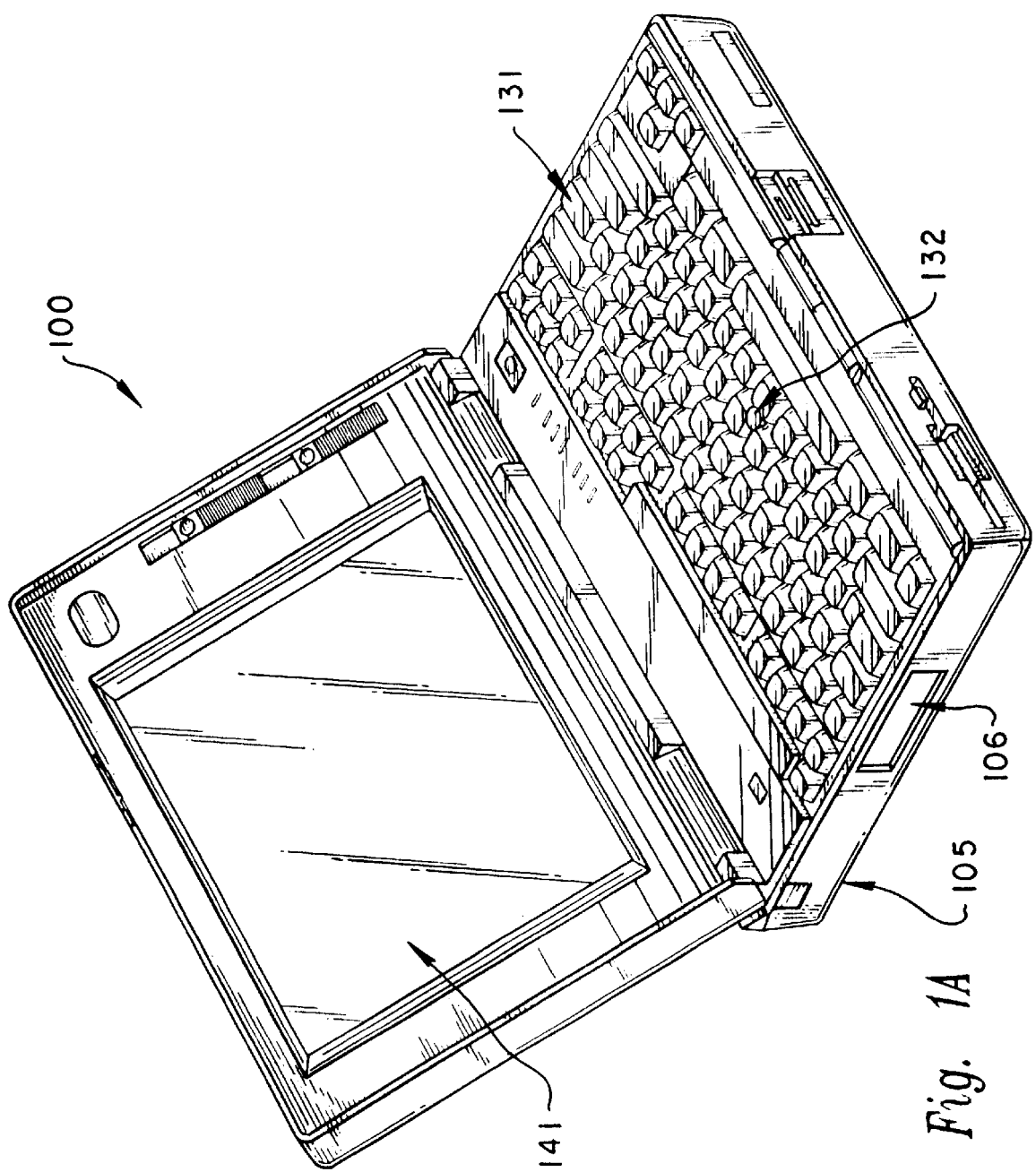
FIG. 1A is an isometric view of a typical portable personal computer which utilizes the apparatus and system of the present invention.

Referring now to the drawings, and in particular with reference to FIG. 1A, there is depicted an isometric view of a typical portable personal computer (PC) 100 which utilizes the apparatus and system of the present invention. Portable PC 100 comprises keyboard 131, mouse 132 and screen monitor 141, all enclosed within chassis 105 having an opening 106.

Figure 1B:
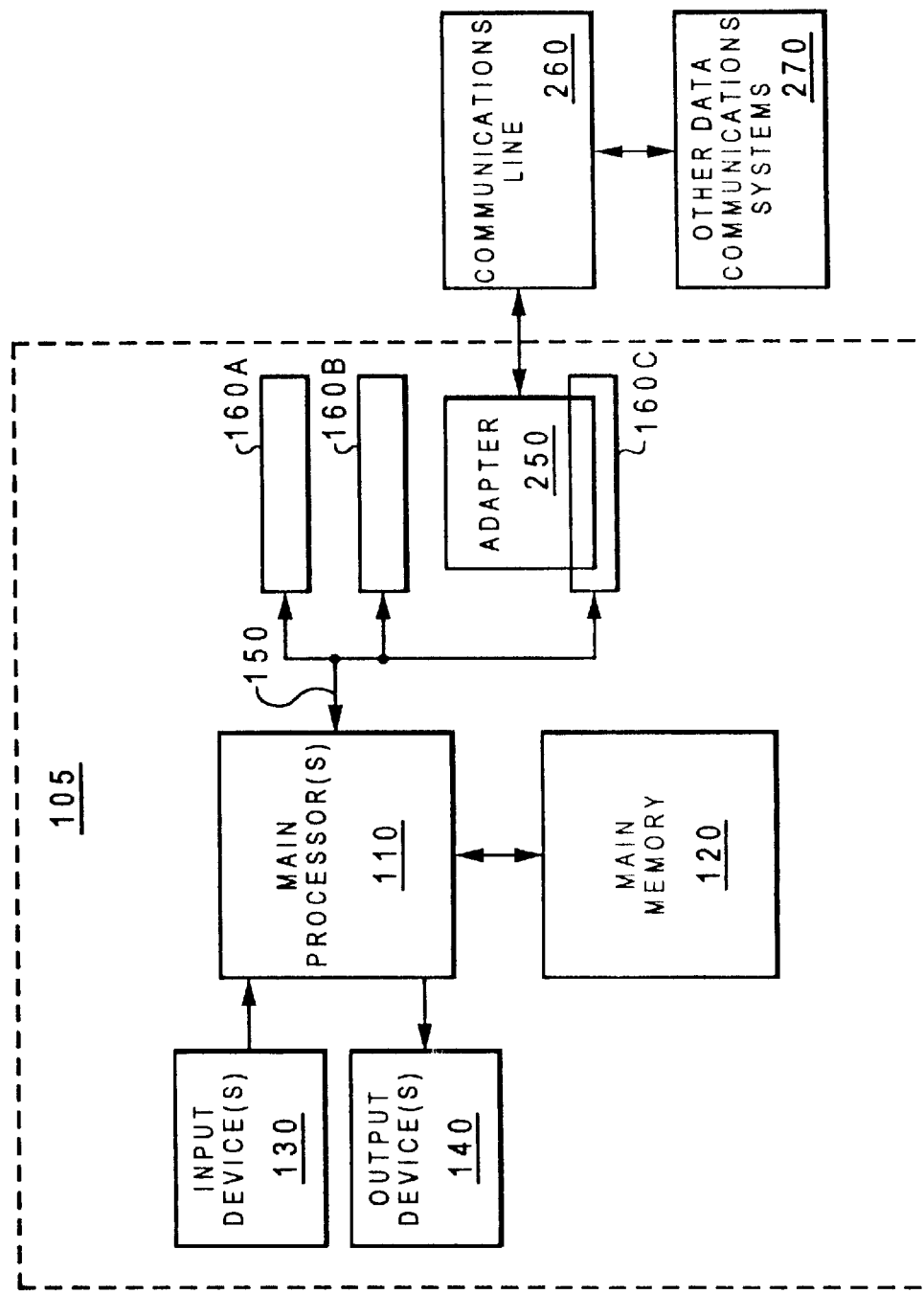
FIG. 1B is a block diagram of the typical portable personal computer depicted in FIG. 1A.

Referring to FIG. 1B, there is illustrated a block diagram of portable PC 100 from FIG. 1. Portable PC 100 includes main processor(s) 110 coupled to a main memory 120 in chassis 105 having input device(s) 130 and output device(s) 140 included within. Main processor(s) 110 may include a single processor or multiple processors. Input devices 130 include keyboard 131 and mouse 132. Output device 140 includes screen monitor 141. Slots 160A, 160B and 160C can be accessed through opening 106 (of FIG. 1A). Adapters for various kinds of peripheral devices may be added to slots 160A, 160B and 160C in order to provide communications with main processor 110 via bus 150. In a preferred embodiment of the invention, slots 160A, 160B and 160C are defined under Personal Computer Memory Card International Association (PCMCIA) standard and bus 150 is an industry standard architecture (ISA) bus such as AT/ISA or EISA. As shown in FIG. 1B, adapter 250 is situated in slot 160C while slots 160A and 160B remain open. Adapter 250 may provide data communications with other data communications systems 270 across communications line 260. As a preferred embodiment of the invention, adapter 250 is capable of transferring data to either an analog or a digital communication platform utilized by other data communications systems 270 located at a remote site.

Hardware Environment

Figure 2:
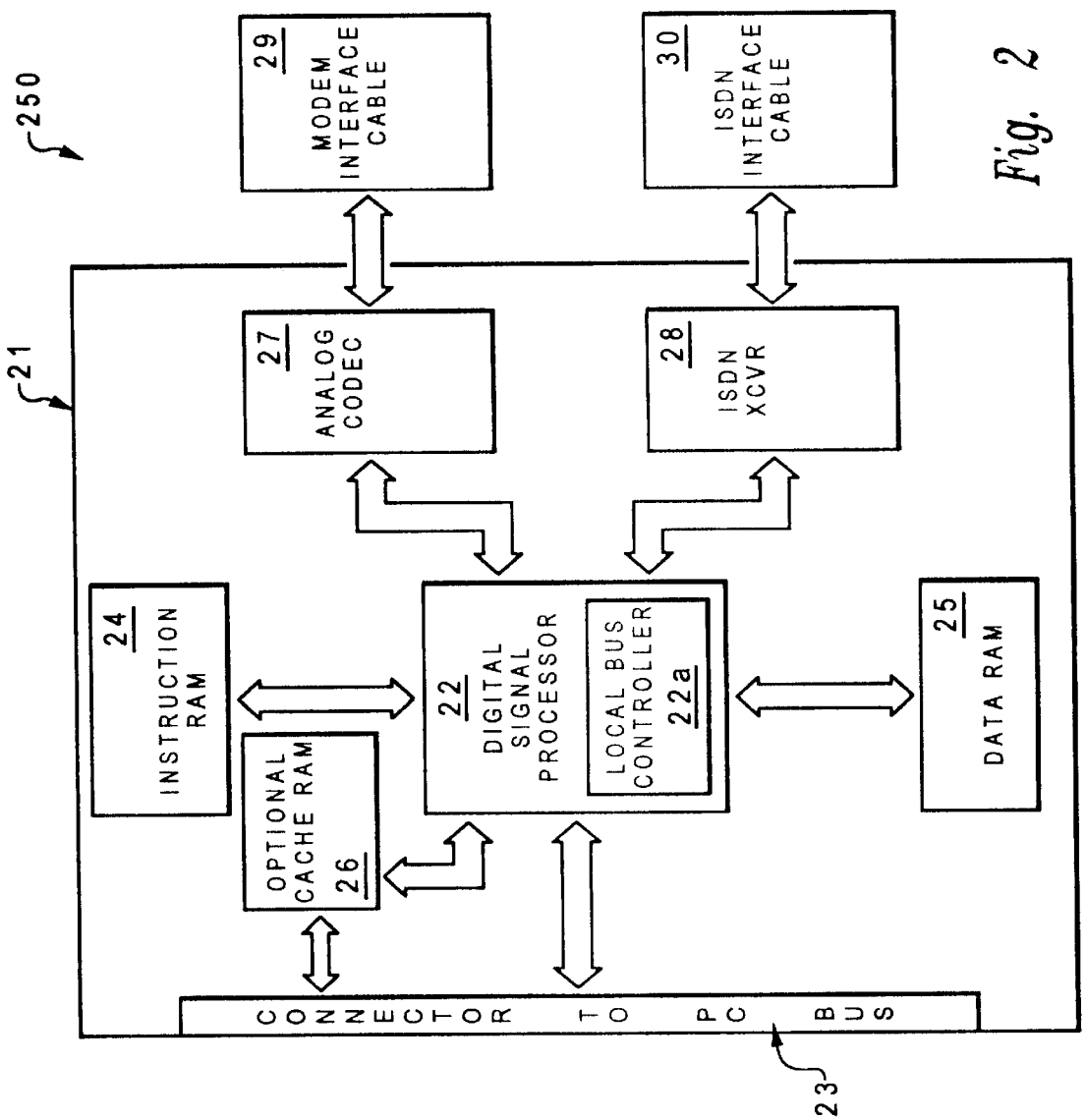
FIG. 2 is a block diagram depicting a preferred embodiment of the present invention having a modem/ISDN combination.

Referring now to FIG. 2, there is illustrated a block diagram of adapter 250 having a codec/ISDN combination, according to a preferred embodiment of the invention. Adapter 250 utilizes a programmable digital signal processor (DSP) 22 to provide the functionality of both analog and digital data communications. DSP 22 is similar to the DSPs described in U.S. Pat. No. 4,991,169 to Davis et al., entitled Real-Time Digital Signal Processing relative to Multiple Digital Communication Channels and U.S. Pat. No. 4,794,517 to Esteban et al., entitled Three Phased Piplined Signal Processor, both of which are incorporated within. However, as would be readily apparent to one skilled in the relevant art, the present invention may operate with any DSP architecture. In a preferred embodiment of the invention, DSP 22 is implemented with a processor instruction cycle of 48.7 ns (20.5 MPS) and allows both B channels of the ISDN for data transmission while reserving D channel of the ISDN for X.25 and signalling communication usage.

DSP 22 is coupled to main processor 110 of the portable PC in FIG. 1 via bus 150 and the connection between adaptor slot 160C and slot connector 23. In a preferred embodiment of the invention, slot connector 23 is also implemented under the PCMCIA standard. In addition, local bus controller 22a of DSP 22 may utilize either a COMM port support (not shown) or a direct memory access (DMA) support (not shown) within local bus controller 22a for communications with bus 150. Alternatively, the invention may be implemented with other types of bus standard such as Micro Channel Bus, AT/ISA, EISA or PCI local bus.

DSP 22 is coupled to instruction random access memory (RAM) 24 which, in a preferred embodiment of the invention, can store up to at least 32 K×24 bits of instructions. Instruction RAM 24 may be loaded with software instructions from the portable PC of FIG. 1 to define the functionality of DSP 22. DSP 22 is also coupled to data RAM 25 which, in a preferred embodiment of the invention, can store up to at least 32 K×16 bits of data. DSP data RAM 25 provides a working storage for DSP 22, and may be loaded with data from the portable PC of FIG. 1 to initialize certain parameters for the operation of adapter 250. As a preferred embodiment of the invention, an optional cache RAM 26 may be added to buffer any data that is passed between DSP 22 and the portable PC of FIG. 1.

An analog coder/decoder (codec) 27 is connected to a first peripheral port of DSP 22. Analog codec 27 is a single integrated circuit (IC) device that combines the analog-to-digital and digital-to-analog conversion functions. DSP 22 exchanges digitized modem signals with analog codec 27 which converts these signals to or from the analog waveforms required by an analog modem.

An ISDN transceiver 28 is connected to a second peripheral port of DSP 22. ISDN transceiver 28 may be configured to output S/T interface format or other ISDN adapter formats such as U interface format. DSP 22 exchanges high-speed digital data with ISDN transceiver 28 which inserts or extracts those data into or from the ISDN frame structure transmitting to and receiving from the ISDN network.

When using the analog modem function, a modem interface cable 29 is connected to adapter 250. In a preferred embodiment of the invention, modem interface cable 29 contains discrete components such as resistors, capacitors, relays, transformers, etc., that are required for connection to the public switched telephone network. Alternatively, the discrete components can be integrated onto carrier board 21 itself, which may result in a less expensive cable but a more expensive board. Within the connector (not shown) which ties modem interface cable 29 to carrier board 21, one or more pins are utilized to indicate the presence of modem interface cable 29. DSP 22 can subsequently detect the presence of modem interface cable 29 by utilizing any detection scheme that is well-known to a person who is skilled in the relevant art, and activates the microcode for supporting the modem functions accordingly.

When using the digital modem function, an ISDN interface cable 30 is connected to adapter 250. As with modem interface cable 29, ISDN interface cable 30 contains discrete components required for connection to the public ISDN network, and those discrete components can also be integrated onto carrier board 21. The presence of ISDN interface cable 30 can subsequently be detected by DSP 22, which then activates the microcode for supporting ISDN functions accordingly.

Depending on the computational power of DSP 22, the size of instruction RAM 24 and the size of data RAM 25, adapter 250 may be able to support both modem and ISDN connections simultaneously. When adapter 250 is limited to supporting only one connection at a time, the two interface cables to adapter 250 may share a common connector to insure that both modem interface cable 29 and ISDN interface cable 30 cannot be plugged in at the same time.

Software Environment

Figure 3:
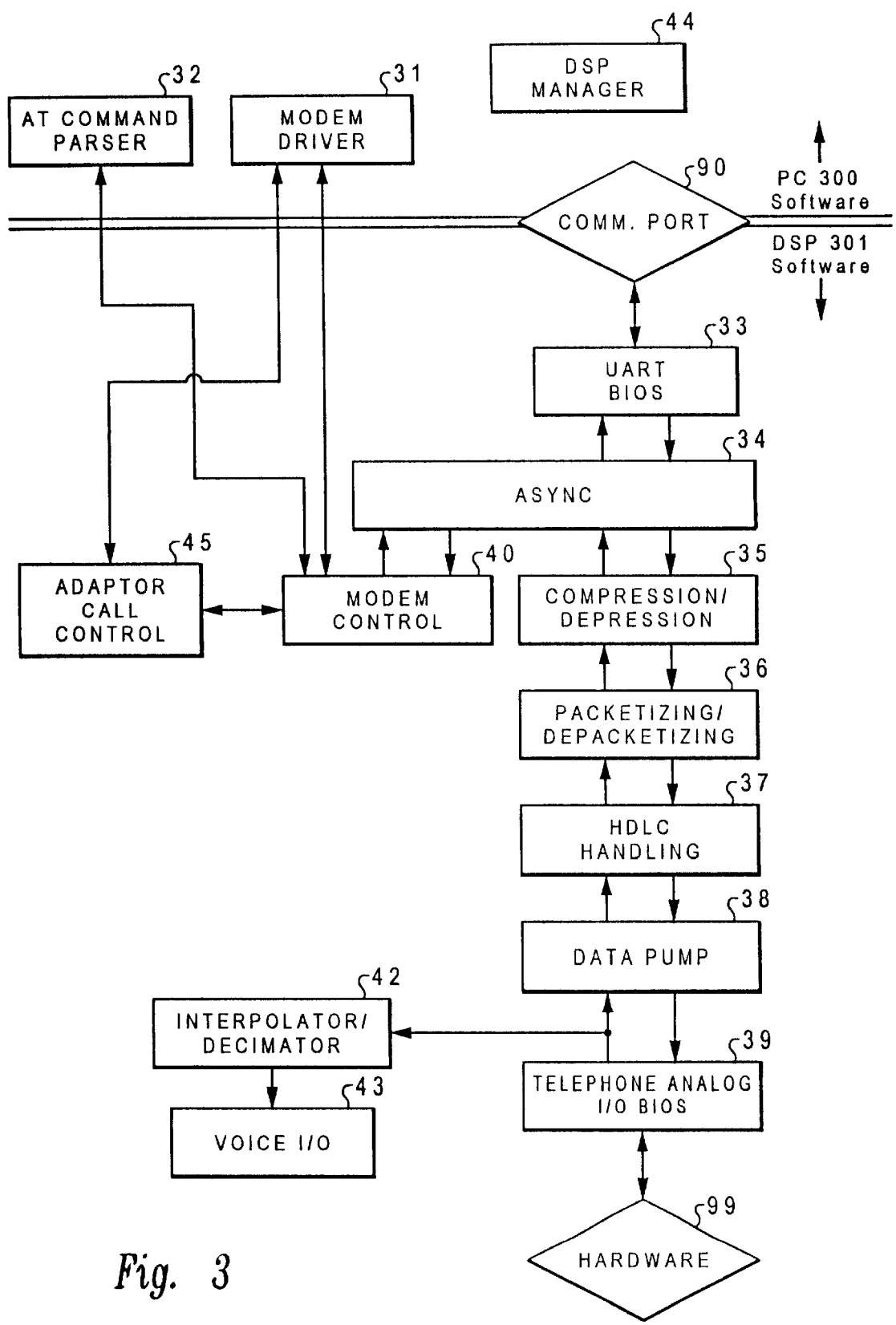
FIG. 3 is a function block diagram illustrating the software tasks for an ISDN modem according to a preferred embodiment of the invention.
Figure 4:
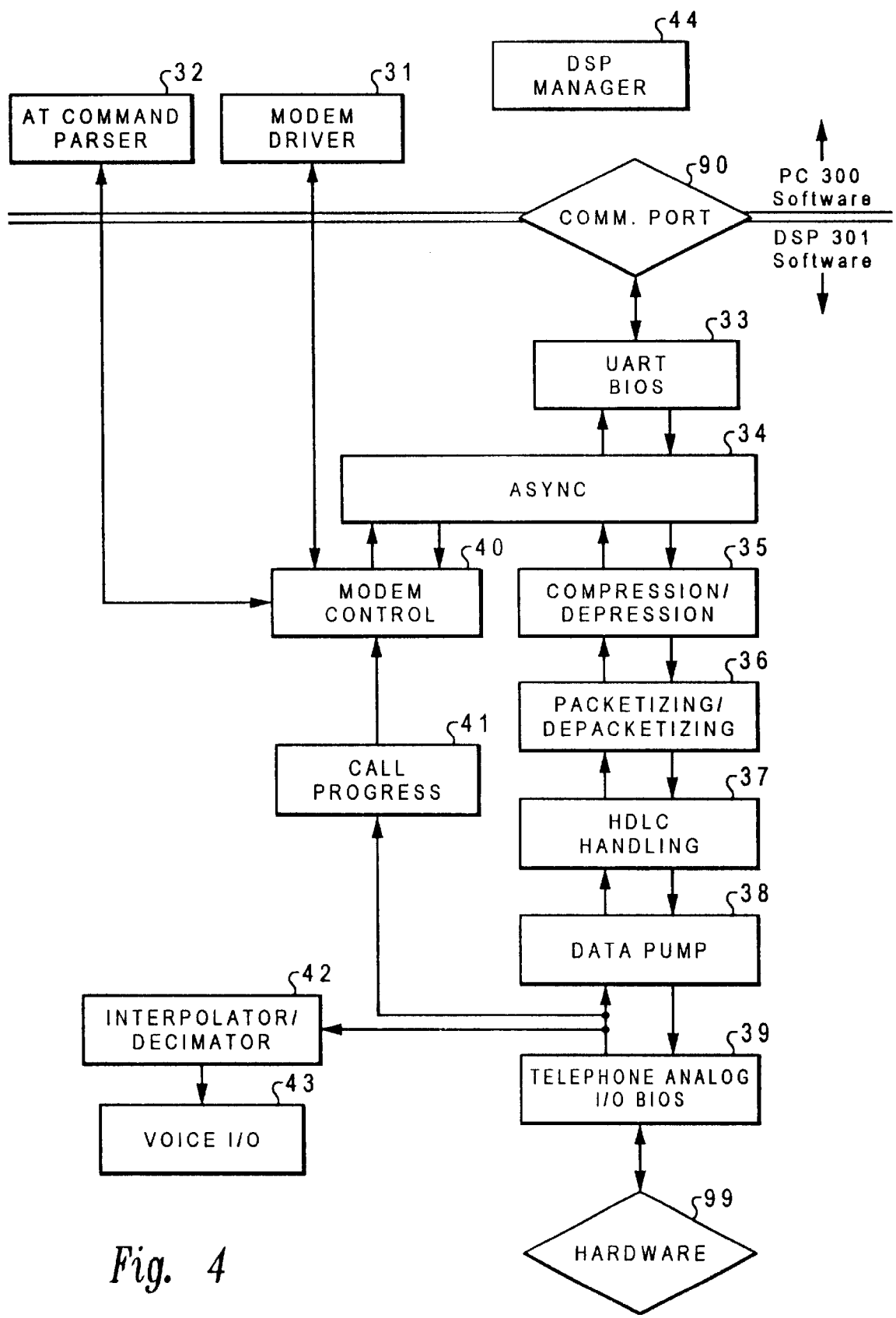
FIG. 4 is a function block diagram illustrating the software tasks for an analog modem according to a preferred embodiment of the invention.

FIGS. 3 and 4 are function block diagrams of the software executing in DSP 22 and main processor 110 according to the function performed by adapter 250. The software environment of the present invention is preferably broken into two sections: PC software 300 and DSP software 301. As will become readily apparent to one skilled in the relevant art, the task functions executing within these sections may be implemented in PC software 300, DSP software 301, hardware or a combination of the three. Task function blocks with like numbers in FIGS. 3 and 4 imply the same task function block is utilized.

a. PC Software

Referring now to FIG. 3, there is illustrated a function block diagram of a digital modem. In a preferred embodiment of the present invention, PC software 300 is written in a combination of C language and assembler programming languages. However, other programming languages now in existence or later developed may be utilized. In a preferred embodiment of the invention, PC software 300 is configured to execute in both OS/2™ and WINDOWS™ environments, however, other workstations or PC environments are equally applicable. On the side of PC software 300 in FIG. 3, there are three relevant PC software tasks, namely, AT command parser 32, modem driver 31 and DSP manager 44.

AT command parser 32 analyzes all the data strings collected by modem control task 40 in DSP software 301, and sends an appropriate command to DSP 22. These commands include, for example, go off hook or send DTMF tones. In the case of digital modem, the command information may be routed to a Q.931 task (not shown) on PC software 300 for call control.

Modem driver 31 causes DSP manager 44 to dynamically load or unload software tasks into instruction RAM 24 (of FIG. 2). Depending on the hardware configuration or the AT commands from AT command parser 32, microcode for data pump 38, error correction scheme such as V.42 or MNP 4, and compression scheme such as MNP 5 or V.42 bis may also be loaded. Modem driver 31 also causes DSP manager 44 to allocate data buffers as required. Essentially, modem driver 31 works in a fashion analogous to other drivers such as ISDN V.120 driver.

In addition, DSP manager 44 also loads and unloads additional DSP tasks into DSP software 301 upon the request of any other active drivers in PC software 300, and binds those tasks as they are being loaded. DSP manager 44 also allocates data space in data RAM 25 when a DSP task is requesting such space. Finally, DSP manager 44 also routes interrupts from DSP tasks to their corresponding driver in PC software 300.

b. DSP Software

In a preferred embodiment of the invention, all tasks shown in FIG. 3 and 4 are executed under a 9.6 KHz interrupt. Frame manager selection should consider the rate at which data is being processed by the ISDN telephone analog I/O (TAIO) task 39. (Frame 6 with the 9.6 KHz interrupt processes 5 bytes per B channel, making N×6 a convenient frame size to process N×5 bytes.) The various DSP tasks in DSP software 301 communicate with each other and with the tasks running in PC software 300, using circular buffer structures and control block structures in the memory of DSP 22.

Telephone analog I/O (TAIO) BIOS 39 interfaces with hardware 99 via a circular buffer with a hardware driven pointer. Input and output samples are interleaved within the same buffer. New samples in the digital modem are loaded into and unloaded from the buffer at a rate of 32 Kbytes per second in each direction. Each data byte is loaded in the low byte of a DSP word; buffer boundaries are aligned for synchronization to the ISDN framing. TAIO task 39 must de-multiplex this interface into four distinct channels corresponding to one D channel, two B channels, and one channel for layer 1 maintenance and control functions. In the analog modem function of FIG. 4, TAIO task 39 loads and unloads interleaved samples from the buffer at a 9.6 KHz rate.

Data is then passed from TAIO BIOS task 39 to data pump 38. Subsequent processing converts 5 samples in the digital modem at 8 KHz into 6 samples at a phase-locked 9.6 KHz rate via an Interpolation-Decimation task 42 in order to satisfy the requirements of data pump 38. Interpolation-decimation procedure is well known in the art for sample rate conversion. Nevertheless, this interpolation-decimation is not required for the analog modem function of FIG. 4. This dictates the hardware requirement to phase-lock the 8 and 9.6 KHz interrupts on DSP 22 with the ISDN network clocking so that the interpolation-decimation process will be synchronous. It also dictates that TAIO BIOS task 39 runs under the 9.6 KHz interrupt dispatched on every sixth interrupt. The frame size is chosen to ensure transmit and receive buffers will not overflow.

The interpolation-decimation task 42 converts the audio call progress sounds, such as dial tone, DTMF tone or ringing, at 9.6 KHz to 44.1 KHz samples for production by the digital audio task 43. In the digital modem function of FIG. 3, audio sounds are created to emulate the analog sounds. In the analog modem function of FIG. 4, these sounds are sampled at the connection point.

Digital audio I/O task 43 provides a digital signal to PCMCIA interface connector 23 in accordance with the PCMCIA standard. This interface is for routing call progress tones to the system speaker.

Data pump 38 performs modulation and demodulation of the data in conformance with ITU-T recommendations, such as V.34, V.32 bis and V.32, by using techniques that are well-known to those who are skilled in the relevant art. HDLC handling task 37 performs the functions common to protocols like V.42 and V.120. The transmit functions include flag fill, zero-bit-insertion for transparency and CRC generation. The receive functions include flag, abort, and idle detection, zero-bit-deletion for transparency and CRC checking. The techniques to perform these transmit and receive functions are also well-known to those who are skilled in the relevant art.

Packetizing/de-packetizing task 36 forms the data to be transmitted into blocks preceded by numbered headers for reliable transmission. Numbers of received blocks are checked to make sure none are lost, and blocks with errors are re-requested.

Compression/decompression task 35 compresses data to be transmitted and decompresses received data in accordance with common practices. Async task 34 monitors states. In command, async task 34 detects AT commands and passes them to modem control 40. If the protocol to be utilized is non-error correcting, it adds start, stop, and parity bits to the transmitted bytes and deletes these bits from the received bytes. UART BIOS task 33 isolates hardware specifics from the async task 34. In addition, UART BIOS task 33 also provides a 16 byte FIFO in each direction.

Modem control task 40 passes AT commands to the AT command parser 32 and accepts commands to change the modem's state from the AT command parser 32 and from the modem driver 31, and communicates these to async task 34. These commands might include word length, parity, etc.

In the digital modem function of FIG. 3, the dial strings are converted to Q.931 messages and sent via adapter call control 45 and modem control 40 to TAIO BIOS 39 where they are inserted in the D-channel time slot for transmission.

In the analog modem function of FIG. 4, modem control 40 receives dialing strings from the modem driver 31 and causes appropriate actions, such as hook switch, DTMF generation, etc., to take place. Call process 41 monitors the status of a call being initiated. Examples of such status include ring back, busy, fast busy, etc.

When configured for 56/64 Kbps digital interface or auto selection via Q.931 response, modem control task 40 must connect the high-speed protocol tasks, the UART BIOS task 33, using the same connections the modem data pump 38. Additional drivers control the required linking for other functions.

Alternative Embodiments

Referring now to FIG. 5, there is illustrated a block diagram of adapter 250a having a codec/ethernet combination, according to an alternative embodiment of the invention. Adapter 250a utilizes DSP 22 to control the function of either a modem or an ethernet high-speed digital connection. DSP 22 is coupled to main processor 110 of the portable PC in FIG. 1 via the connection of slot connector 23 to slot 160A, 160B or 160C.

Instruction RAM 24 may be loaded with software instructions from the portable PC to define the functionality of DSP 22. Data RAM 25 provides a working storage for DSP 22, and may be loaded with data from the portable PC to initialize certain parameters for operation. As a preferred embodiment of the invention, optional cache RAM 26 may be utilized to buffer data passed between DSP 22 and the portable PC.

An analog codec 27 is connected to a first peripheral port of DSP 22. DSP 22 exchanges digitized modem signals with analog codec 27 which then converts these signals to or from the analog waveforms required by a modem. An ethernet transceiver 83 is connected to a second peripheral port of DSP 22. DSP 22 exchanges high-speed digital data with ethernet transceiver 83 which then inserts or extracts that data into or from the ethernet LAN frame structure transmitting to and receiving from the LAN.

When using the analog modem function, a modem interface cable 29 is connected to adapter 250a. As mentioned previously, modem interface cable 29 contains discrete components such as resistors, capacitors, relays, transformers, etc. that are required for connection to the public switched telephone network. Similar to carrier board 21 illustrated in FIG. 2, the discrete components can alternatively be packaged onto carrier board 21a. Within the connector (not shown) that ties modem interface cable 29 to carrier board 21a, one or more pins may be utilized to indicate the presence of modem interface cable 29. DSP 22 can detect the presence of modem interface cable 29 and subsequently activates the microcode to support modem functions accordingly.

When using the ethernet adapter function, an ethernet interface cable 83 is connected to adapter 250a. Like modem interface cable 29, ethernet interface cable 83 also contains discrete components required for the ethernet connection to the LAN. By utilizing the detection scheme mentioned previously, the presence of ethernet interface cable 83 can also be sensed by DSP 22 which then activates the microcode to support the ethernet connections accordingly.

Depending on the computational power of DSP 22, the size of instruction RAM 24, and the size of data RAM 25, adapter 250a may be able to support both modem and LAN connections simultaneously, or may only be one at a time. When limited to supporting only one at a time, the two interface cables to adapter 250a may share a common connector to insure that both modem interface cable 29 and ethernet interface cable 83 cannot be plugged in at the same time.

The first advantage of the present invention is its ability to allow a user to connect a computer to either an analog public network service such as PSTN and/or a digital public network such as ISDN for data communications by simply switching interface cables. Thus, a travelling office worker can connect to whatever type of telephone services being offered at various locations such as branch offices, hotel, etc.

By combining with the prior art, the second advantage of the present invention is its ability to provide communications with data circuit terminating equipments (DCE) such as modems or fax machines attached to a PSTN service such as an analog telephone line via an ISDN service. This functionality allows a user to communicate with a mix of data communications equipments distributed over ISDN and PSTN lines, while maintaining the ability to communicate with equipments attached to an ISDN line.

Although only two embodiments of the present invention have been demonstrated thus far, it should be readily apparent at this juncture to a person who is skilled in the relevant art that any combination of analog codec 27, ISDN transceiver 28 and ethernet transceiver 82 can be utilized for achieving the objectives of the invention. Hence, while the invention has been particularly shown and described with reference to a preferred embodiment, it will be understood by those skilled in the art that various changes in form and detail may be made therein without departing from the spirit and scope of the invention.

What is claimed is:

1. An adapter for transferring data between a data processing system and at least one data communications system by remotely linking said at least one data communications system to said data processing system, said adapter comprising:

a casing having an aperture at one end of said casing;

a carrier board having a connector for connecting to a port of said data processing system, wherein said carrier board is mounted within said casing with said connector accessible via said aperture in said casing;

a single programmable digital signal processing means mounted on said carrier board, wherein said single programmable digital signal processing means communicates with said data processing system via said connector;

a memory means mounted on said carrier board, said memory means storing software program means for instructing said single programmable digital signal processing means;

at least one interface cable means for connecting said adapter to at least one public communications network which links to said at least one data communications system, wherein said connection of said at least one interface cable means to said adapter can be detected by said single programmable digital signal processing means; and a plurality of transceiving means mounted on said carrier board, wherein one or all of said plurality transceiving means can be activated by said single programmable digital signal processing means for providing data communications to said at least one remote-data communications system, in response to the type of said at least one interface cable means connected to said adapter.

2. The adapter for transferring data between a data processing system and at least one data communications system remotely linked to said data processing system in claim 1, wherein said plurality of transceiving means includes an analog coder/decoder and an ISDN transceiver.

3. The adapter for transferring data between a data processing system and at least one data communications system remotely linked to said data processing system in claim 1, wherein said plurality of transceiving means includes an analog coder/decoder and an ethernet transceiver.

4. The adapter for transferring data between a data processing system and at least one data communications system remotely linked to said data processing system in claim 1, wherein said plurality of transceiving means includes an analog coder/decoder, an ISDN transceiver and an ethernet transceiver.

5. The adapter for transferring data between a data processing system and at least one data communications system remotely linked to said data processing system in claim 1, wherein said at least one public communications network includes a public switched telephone network and/or a integrated services digital network.

6. An adapter for transferring data between a computer system and at least one data communications equipment by remotely linking said at least one data communications equipment to said computer system, said adapter comprising:

a casing having an aperature at one end of said casing;

a carrier board having a connector for connecting to a port of said computer system, wherein said carrier board is mounted within said casing with said connector accessible via said aDerture in said casing;

a single programmable digital signal processing means mounted on said carrier board, wherein said single programmable digital signal processing means communicates with said computer system via said connector means;

a memory means mounted on said carrier board, said memory means storing software program means for instructing said single programmable digital signal processing means;

a first interface cable means for connecting said adapter to a public switched network which links to said at least one data communications equipment, and a second interface cable means for connecting said adapter to an integrated service digital network which links to said at least one data communications equipment, wherein said connections of any of said interface cable means to said adapter can be detected by said programmable digital signal processing means; and an analog data transceiving means and a digital data transceiving means mounted on said carrier board, wherein one or both of said transceiving means can be activated by said single programmable digital signal processing means for providing data communication to said at least one data communication system, in response to said detection of said interface cable connected to said adapter.

7. The adapter for transferring data between a computer system and at least one data communications equipment remotely linked to said computer system in claim 6, wherein said analog data transceiving means is an analog coder/decoder and said digital data transceiving means is an ISDN transceiver.

8. The adapter for transferring data between a computer system and at least one data communications equipment remotely linked to said computer system in claim 6, wherein said analog data transceiving means is an analog coder/decoder and said digital data transceiving means is an ethernet transceiver.

9. An adapter for transferring data between a data processing system and at least one data communications system by remotely linking said at least one data communications system to said data processing system, said adapter comprising:

a carrier board having a connector means for connecting to a port of said data processing system;

a single programmable digital signal processor (DSP) mounted on said carrier board, wherein said single programmable digital signal processor communicates with said data processing system via said connector means;

a memory mounted on said carrier board, said memory storing software program for instructing said single programmable digital signal processor to generate different data streams with each data stream being compatible with one of a plurality of different transmission modes;

at least one interface cable means containing information identifying at least one of the data transmission modes for at least one of the data streams, for connecting said adapter to at least one public communications network which links to said at least one data communications system, wherein said connection and the data transmission mode of said at least one interface cable means to said adapter can be detected by said single programmable digital signal processor; and a plurality of transceiving means mounted on said carrier board, wherein one or all of said transceiving means can be activated by said programmable digital signal processing means for providing data communications to said at least one remote data communications system, according to the type of said at least one interface cable means connected to said adapter.

10. The adapter for transferring data between a data processing system and at least one data communications system remotely linked to said data processing system in claim 9, wherein said plurality of transceiving means includes an analog coder/decoder and an ISDN transceiver.

11. The adapter for transferring data between a data processing system and at least one data communications system remotely linked to said data processing system in claim 9, wherein said plurality of transceiving means includes an analog coder/decoder and an ethernet transceiver.

12. The adapter for transferring data between a data processing system and at least one data communications system remotely linked to said data processing system in claim 9, wherein said plurality of transceiving means includes an analog coder/decoder, an ISDN transceiver and an ethernet transceiver.

13. The adapter for transferring data between a data processing system and at least one data communications system remotely linked to said data processing system in claim 9, wherein said at least one public communications network includes a public switched telephone network and/ or a integrated services digital network.

14. An adapter for transferring data between a computer system and at least one data communications equipment by remotely linking said at least one data communications equipment to said computer system, said adapter comprising:

- a carrier board having a connector means for connecting to a port of said computer system;
- a single programmable digital signal processing means mounted on said carrier board, wherein said single programmable digital signal processing means communicates with said computer system via said connector means;
- a memory mounted on said carrier board, said memory storing software program means for instructing said programmable digital signal processing means to generate a plurality of data streams compatible with a plurality of data transmission modes;
- a first interface cable means, carrying a code representative of at least one of the plurality of transmission modes in which at least one of the data streams is to be formatted, for connecting said adapter to a public switched network which links to said at least one data communications equipment and a second interface cable means, carrying a code representative of at least one of the plurality of transmission modes in which at least one of the data streams is to be formatted, for connecting said adapter to an integrated service digital network which links to said at least one data communications equipment, wherein said connections and data stream formatting of any of said interface cable means to said adapter can be detected by said single programmable digital signal processing means; and
- an analog data transceiving means and a digital data transceiving means mounted on said carrier board, wherein one or both of said transceiving means can be activated by said single programmable digital signal processing means for providing data communication to said at least one remote data communication system, according to said detection of said interface cable connected to said adapter.

15. The adapter for transferring data between a computer system and at least one data communications equipment remotely linked to said computer system in claim 14, wherein said analog data transceiving means is an analog coder/decoder and said digital data transceiving means is an ISDN transceiver.

16. The adapter for transferring data between a computer system and at least one data communications equipment remotely linked to said computer system in claim 14 wherein said analog data transceiving means is an analog coder/decoder and said digital data transceiving means is an ethernet transceiver.

* * * * *